United States Patent
Mueller et al.

(10) Patent No.: US 6,231,051 B1
(45) Date of Patent: May 15, 2001

(54) CABLE SLEEVE CONSISTING OF A SOCKET PIPE HAVING AT LEAST ONE TRANSVERSELY DIVIDED END MEMBER

(75) Inventors: Thorsten Mueller, Menden; Rainer Zimmer, Schalksmuehle, both of (DE)

(73) Assignee: RXS Kabelgarnituren GmbH, Hagen (DE)

( * ) Notice: Subject to any disclaimer, the term of this patent is extended or adjusted under 35 U.S.C. 154(b) by 0 days.

(21) Appl. No.: 09/207,029

(22) Filed: Dec. 8, 1998

(30) Foreign Application Priority Data

Dec. 9, 1997 (DE) ............................................. 197 54 608

(51) Int. Cl.[7] ................................................. F16L 21/05
(52) U.S. Cl. .................... 277/603; 277/616; 277/620; 174/21 R; 174/77 R; 174/93; 33/562
(58) Field of Search ..................... 277/603, 616, 277/620; 174/77 R, 93, 21 R, 65 G, 65 R, 845; 385/136; 33/555.2, 565, 567, 567.1

(56) References Cited

U.S. PATENT DOCUMENTS

| | | | |
|---|---|---|---|
| 3,692,926 | * | 9/1972 | Smith ..................................... 174/92 |
| 4,103,911 | | 8/1978 | Giebel et al. ......................... 277/606 |
| 4,424,412 | * | 1/1984 | Goetter et al. ........................ 174/92 |
| 4,538,021 | | 8/1985 | Williamson, Jr. . |
| 4,584,780 | * | 4/1986 | Pressey ................................. 33/563 |
| 4,712,800 | * | 12/1987 | Johnson . |
| 4,733,019 | * | 3/1988 | Pichler et al. ........................ 174/92 |
| 4,839,471 | * | 6/1989 | Clark et al. ........................... 174/92 |
| 5,006,669 | * | 4/1991 | Bachel et al. ......................... 174/93 |
| 5,199,724 | | 4/1993 | Meltsch et al. ...................... 285/236 |
| 5,231,768 | * | 8/1993 | Beckwith, Jr. ........................ 33/567 |
| 5,235,134 | | 8/1993 | Jaycox .................................. 174/87 |
| 5,313,019 | * | 5/1994 | Brusselmans et al. ............... 174/93 |
| 5,515,614 | * | 5/1996 | Wing ..................................... 33/548 |
| 5,561,268 | * | 10/1996 | Dagan et al. ......................... 174/92 |
| 5,577,328 | * | 11/1996 | Kerry .................................... 33/563 |
| 5,787,219 | * | 7/1998 | Mueller et al. ...................... 385/134 |
| 5,793,921 | * | 8/1998 | Wilkins et al. ...................... 385/135 |

FOREIGN PATENT DOCUMENTS

| | | |
|---|---|---|
| 24 27 677 | 8/1979 | (DE) . |
| 28 26 584 | 12/1979 | (DE) . |
| 28 55 387 | 6/1980 | (DE) . |
| 0 316 911 | 5/1989 | (EP) . |
| 0 440 903 | 8/1991 | (EP) . |
| 0 752 747 | 1/1997 | (EP) . |
| 844718 * | 5/1998 | (EP) ........................... H02G/15/013 |
| WO 97/12268 | 4/1997 | (WO) . |

* cited by examiner

Primary Examiner—Anthony Knight
Assistant Examiner—Alison K. Pickard
(74) Attorney, Agent, or Firm—Schiff Hardin & Waite

(57) ABSTRACT

A cable sleeve consisting of two seal members with adjustable cable entry openings and an integrated cable clamping apparatus. The adjusting in the cable entry opening occurs by removal of concentric adjusting rings, wherein the number of adjusting rings removed and the strength of the sealing wrapper applied are determined with the aid of a template.

15 Claims, 7 Drawing Sheets

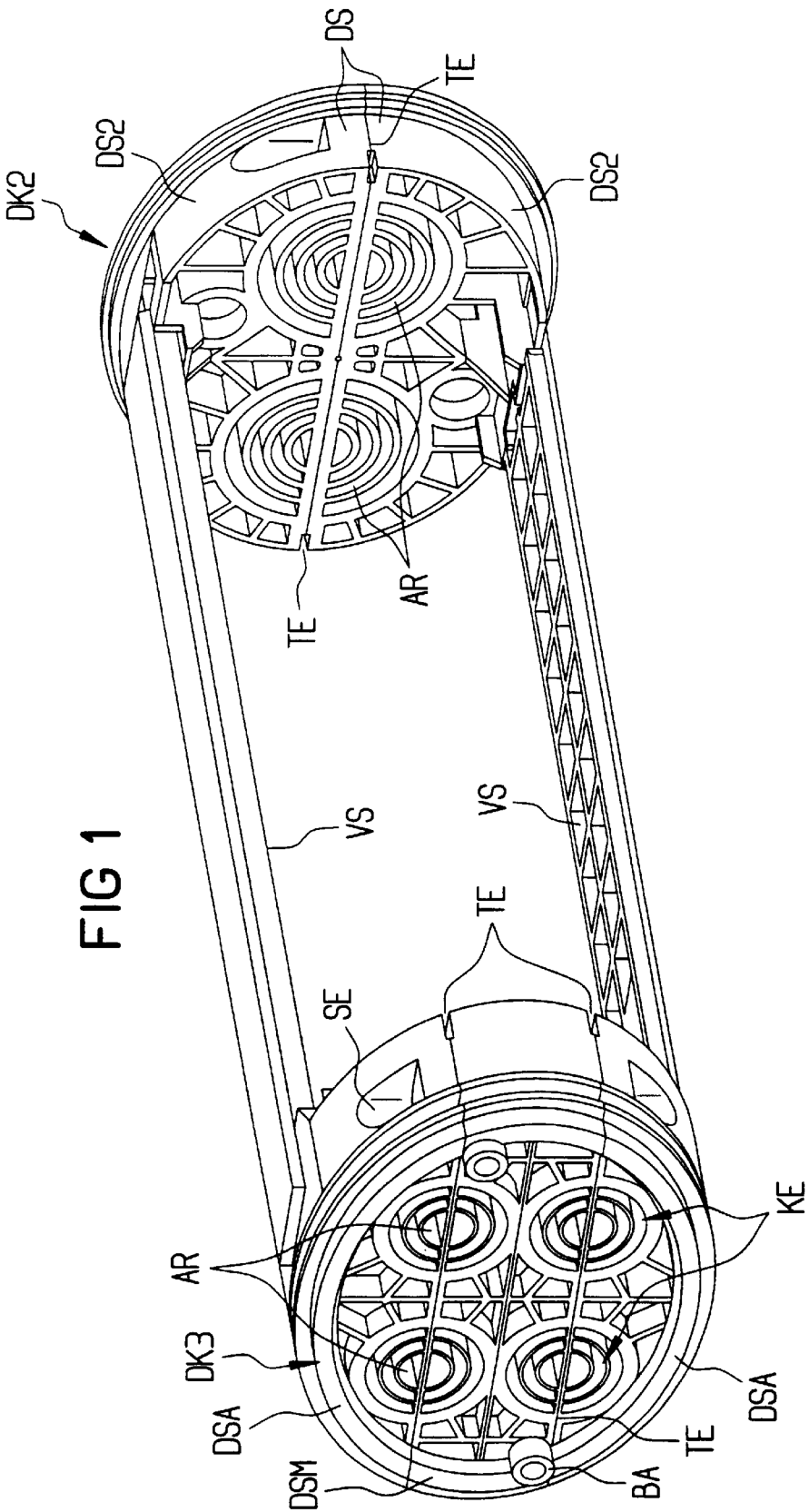

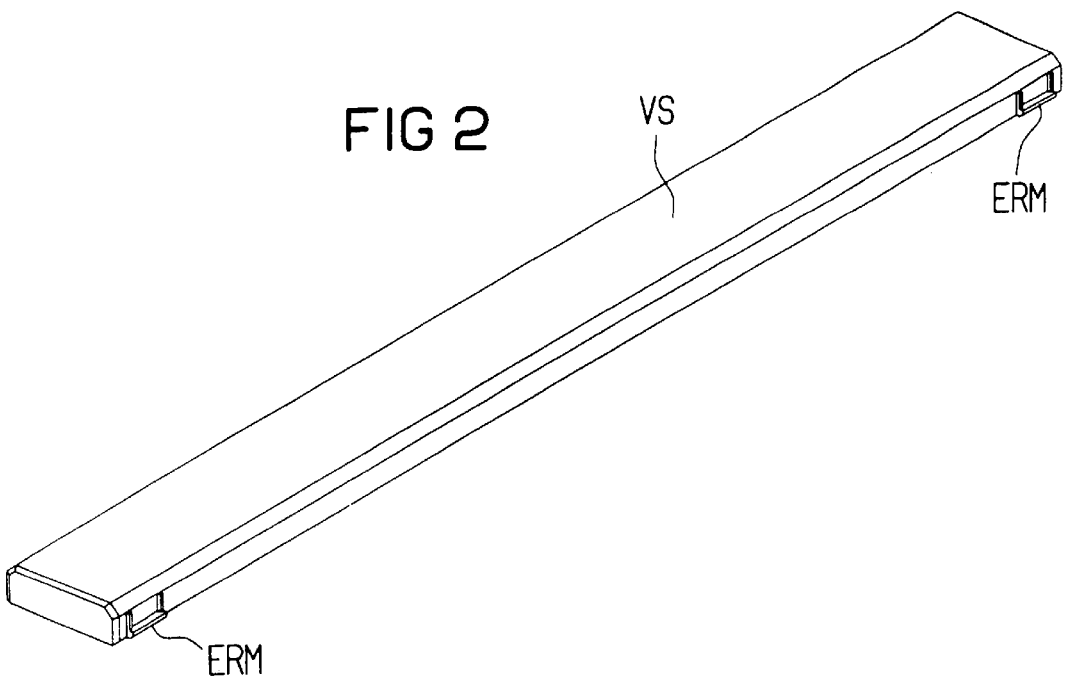
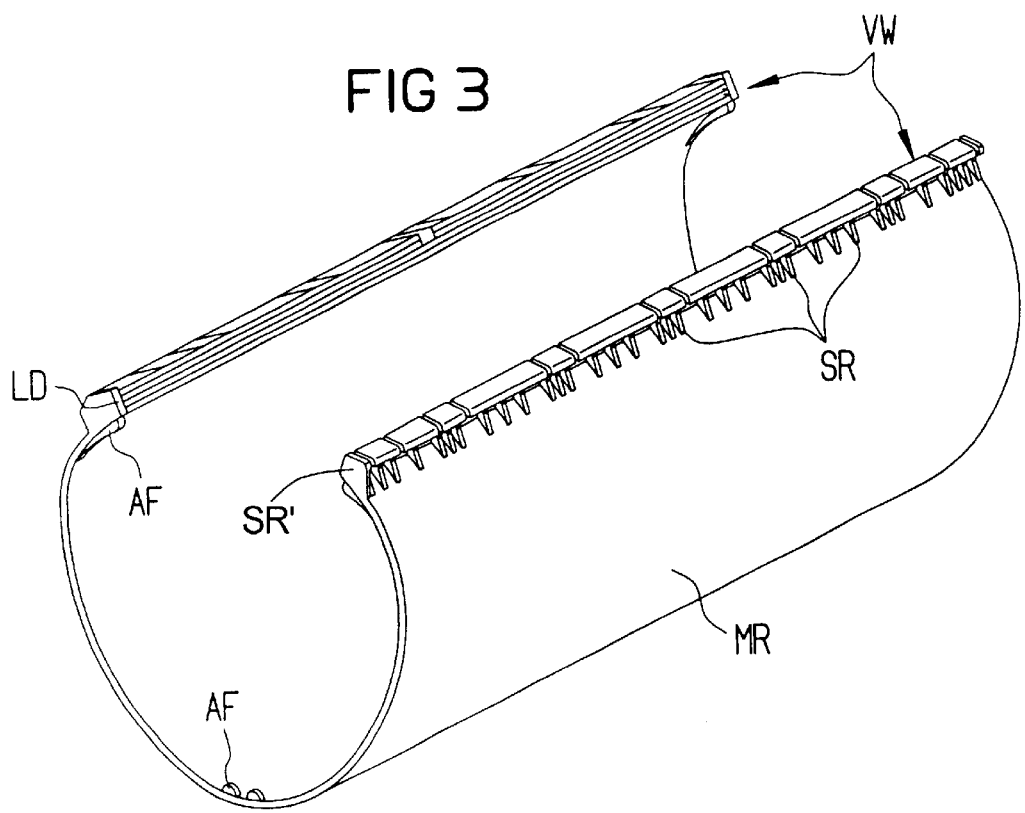

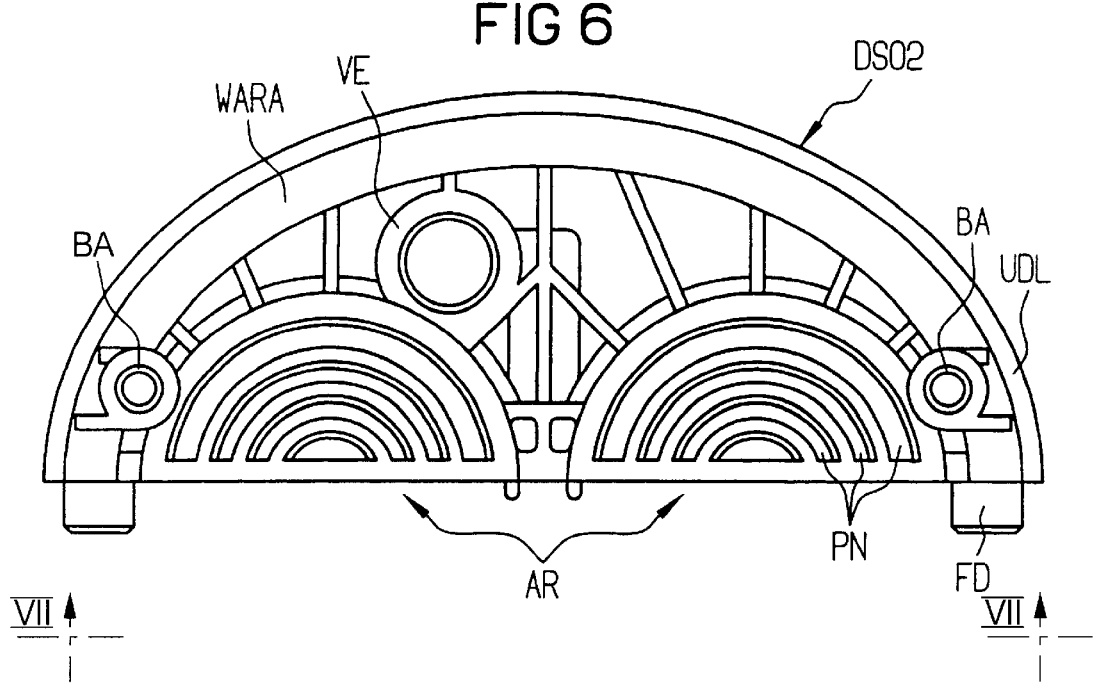
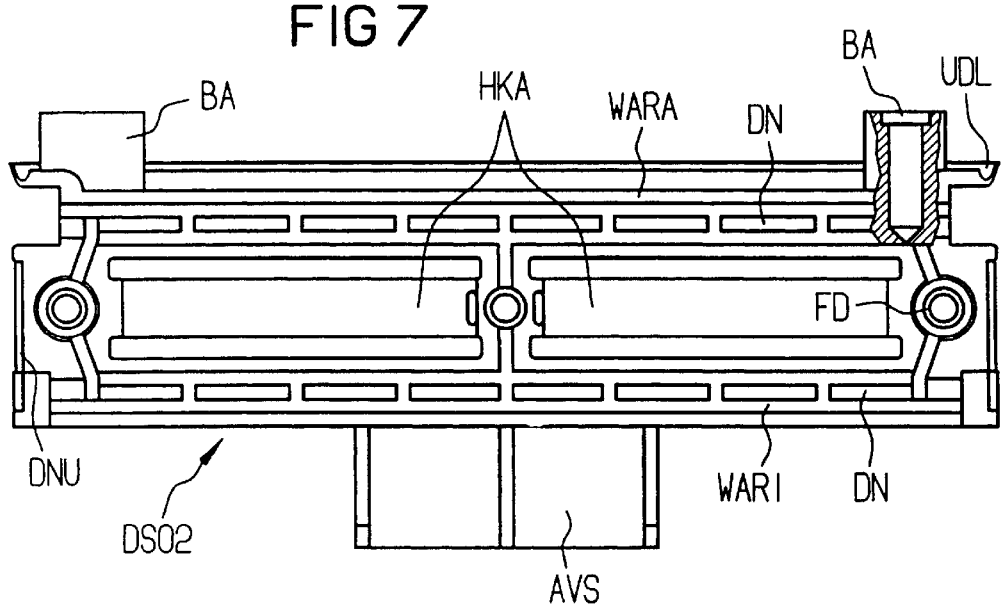

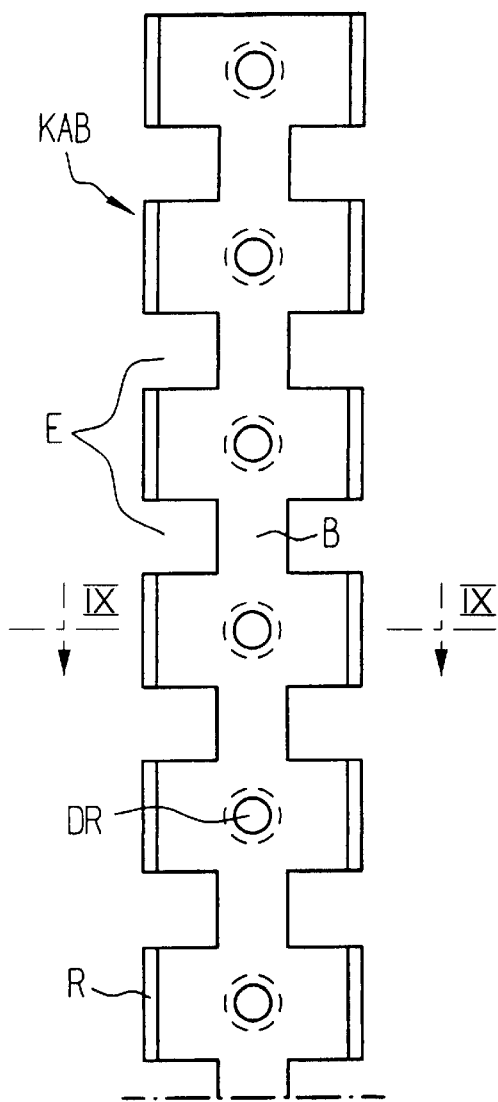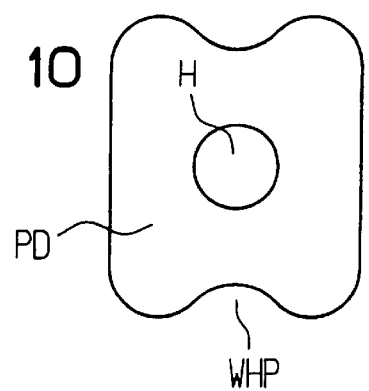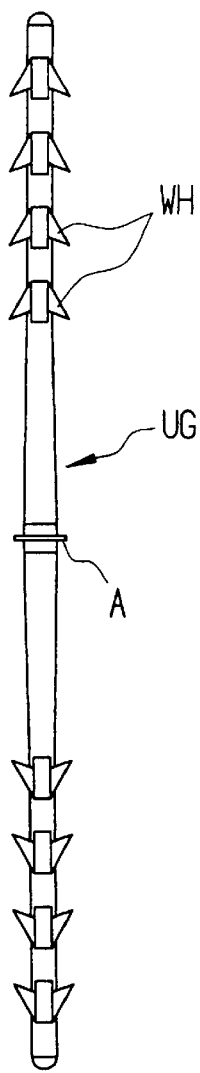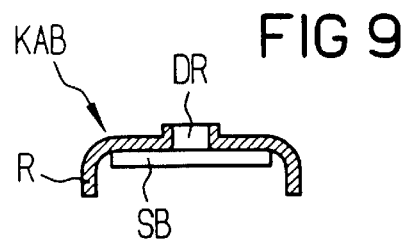

CABLE SLEEVE CONSISTING OF A SOCKET PIPE HAVING AT LEAST ONE TRANSVERSELY DIVIDED END MEMBER

BACKGROUND OF THE INVENTION

The present invention is directed to a cable sleeve consisting of a socket pipe and at least one transversely divided seal member with adjustable cable entry openings on the end face, whereby the adjustment occurs by the removal of concentrically arranged adjusting rings.

U.S. Pat. No. 4,103,911, whose disclosure is incorporated herein by reference thereto, and German PS 24 27 677 both teach a seal member for a cable sleeve, wherein the cable entry openings are cut with the aid of special cutting or boring tools.

U.S. Pat. No. 5,199,724, whose disclosure is incorporated herein by reference thereto and which claims priority from the same German Application as European Patent Application 0 440 903, teaches an adjusting element for the occlusion of entry openings in a cable sleeve, pipe trains and similar apparatus. The diametric adjustment to the inserted objects, for example the cable, occurs in an occluding wall fashioned from concentric separable sealing rings.

U.S. Pat. No. 5,235,134, whose disclosure is incorporated herein by reference thereto, teaches a cup-shaped sleeve, wherein a seal member in which a sealing insert made of a compressible material is inserted and arranged at the entry end. This sealing insert is formed from concentric rings. The adjustment of the cable entry opening to the diameter of the cable occurs by the removal of the concentric rings. The sealing is achieved by axial compression with the aid of corresponding pressure means.

SUMMARY OF THE INVENTION

It is an object of the present invention to improve a cable sleeve of the abovementioned type, wherein, particularly, the cable entries for cut and uncut cables should be designed to be universally and individually adaptable. The stated object is inventively achieved with a cable sleeve of the above-mentioned type in which the seal member is formed from two walls residing in succession in the direction of the axis of the cable sleeve and that the walls are formed in the cable entry openings from separable, concentrically arranged adjusting rings and have a hollow space for a cable clamping arrangement or apparatus respectively arranged in the cable entry opening between the two walls. The cable clamping apparatus is to be assembled on the cables and can be lowered into the hollow space during the leading of the cable into the cable entry openings. A sealing wrapper or coil made of plastic sealing material is arranged in the regions of the walls of the cable sleeve openings on the cable to be inserted, whereby the walls of the sealing member comprise sealing slots or grooves in the parting plane.

The inventive cable sleeve consists of a socket pipe and at least one seal member for cable insertion, wherein the seal member is divided transversely and is assembled from two walls residing in succession, viewed in the axial direction. The two walls are held together at the outer perimeter with a cylindrical or oval wall, whereby a slot is fashioned in this cylindrical wall for the acceptance of a seal relative to the surrounding socket pipe. The seal members consist of two or, respectively, three seal member segments which are pressed together over the cables to be inserted by means of a preferably self-tapping screw. The sealing in the respective parting plane of the seal member and in the cable entry opening in the direction of the cable occurs with plastic sealing material in the form of a sealing wrapper. Slots are located in the parting planes of the walls of the seal member, and these slots enable a better pressing of the inserted sealing wrapper. The seal members can be equipped with a valve or with a ground bushing as needed.

The cable entry openings in the seal members are formed by the removal of concentric adjusting or adjustment rings according to the "onion ring principle". The individual concentric adjusting rings are connected via slot-shaped steppings and are cut out in these thinned slots with the aid of pincers or pliers or by a blade. The cutting edge of the pincers or pliers is formed so that not only the smallest radius but also the largest can be cut. The excision appropriately occurs in a plurality of successive steps up to the required cutout. Since the seal member or, respectively, even the seal member segments are respectively formed from two walls with an intervening hollow space, the two walls must be cut to the corresponding diameter. A mechanical cable clamp is located in the intermediately formed hollow space. This cable clamp consists of a sheet with tears or lancings which are secured on the cable with a hose band clip or a tightening strap.

According to the diameter of the cable to be inserted, a corresponding number of adjusting rings are removed and the sealing strip coil is placed on the cable for sealing. For determining the number of adjusting rings to be removed, a template or gauge is applied in which the number of adjusting rings can be removed as well as the diameter of the sealing wrapper to be applied can be determined. This gauge or template further comprises noses which can be inserted into corresponding lateral notches of the seal member when the seal member segments are pressed at the proper interval. In this way, whether the sealing pressure, which is created by means of pressing the seal member segments together, is sufficient is directly checked.

Furthermore, a springing sealing lip is additionally located on an outer surface of the seal member or, respectively, the seal member segments. This lip, which lies adjacent the socket pipe during closing, thus forms a splash and dust protection. Four screw-on points or, respectively, noses in which securing elements can be screwed on for fixing the sleeve at a bearing rope or on a messenger cable or at a wall or at a mast are respectively formed in the seal member. In addition, receptacles for the locking of connecting bars serving to hold the seal members at a distance are also located on the seal member or seal member segments. It is also possible to add additional elements at the connecting bars, such as receptacles for splice cassettes and the like.

The longitudinal slit socket pipe of the cable sleeve has closure beads correspondingly formed along the longitudinal slit with closure elements being captively locked thereat. These can be activated by hand or with the aid of a screwdriver, whereby the span of the closure elements is designed so that the closure region with inserted seal is pressed with sufficient closing pressure. Ribs are attached at the socket pipe in the region of the closures so that the closure elements are embedded in a positive fashion and are thus secured against accidental opening due to contact or opening by hand. To provide further access protection, a corresponding cover strip can be placed over the closure elements for coverage and can be additionally screwed into the seal member.

The sealing of the seal members to the socket sleeve occurs with an elastic formed gasket which comprises a hollow section on both sides of the seal. This formed gasket can be utilized as a closure ring or in a cut condition, whereby, in the latter case, a connecting element is utilized as a joiner, for example. The connecting element is inserted in the opening at the open end of the formed gasket and telescoped therein.

The securing of the sleeve on a mast, a bearing rope or a wall occurs with a sleeve securing part, which is secured at the noses of the seal members with self-tapping screws, for example. The sleeve fixation part is designed in a universal fashion and comprises securing elements for the various types of fixation.

BRIEF DESCRIPTION OF THE DRAWINGS

FIG. 1 is a perspective view of two sealing members for a cable sleeve which are mutually coupled via connecting bars;

FIG. 2 is a perspective view of a connecting bar;

FIG. 3 is a perspective view of a socket or sleeve pipe;

FIG. 6 is an end view of a seal member segment of a bipartite seal member;

FIG. 7 is a view of the seal member segment of FIG. 6 taken in the direction of arrow VII in FIG. 6;

FIG. 8 is a plan view of a cable clamping apparatus;

FIG. 9 is a cross-sectional view taken along the lines IX—IX of FIG. 8;

FIG. 10 is an end view of a formed gasket member for sealing between the socket pipe and the seal member;

FIG. 11 is a plan view of a transition element for joining two ends of the gasket together to form a ring;

DESCRIPTION OF THE PREFERRED EMBODIMENTS

The principles of the present invention are particularly useful when incorporated in a cable sleeve, which has end members, such as illustrated in FIG. 1, and a socket pipe, such as illustrated in FIG. 3.

The cable sleeve has a pair of end members, which are formed by two oval-shaped seal members DK2 and DK3. The seal member DK2 consists of two identical seal member segments DS2, while the seal member DK3 consists of three seal member segments, which has a center seal member DSM sandwiched between two outer members DSA. Plastic sealing compounds are inserted in respective parting planes TE between the individual seal member segments. The cable entry openings KE reside centrally in the parting planes TE, so that an uncut cable can also be inserted into the cable sleeve. In the "as received" condition, all cable entry openings KE are occluded or closed by adjusting rings AR, which are arranged concentrically and connected via thin ridges. These thin ridges are formed by circular profile slots and allow the simple removal of adjusting rings AR. The cable entry opening is then adjusted to the diameter of the inserted cable, as needed, by removing the adjusting rings AR. In this exemplary embodiment, four cable entry openings KE are provided in the three-part or tripartite seal member DK3, and two cable entry openings are provided in the two-part or bipartite seal member DK2. The seal member segments DSA, DSM and DSA of the seal member DK3 or, respectively, the seal member segments DS2 and DS2 of the seal member DK2 are pressed onto one another with the aid of screws until the required closure pressure is attained, and a sealing member, such as a sealing strip, is intermediately applied in the area of the joint TE. The two seal members DK2 or, respectively, DK3 possess noses on which connecting bars VS are attached, thus holding these at the proper distance relative to each other.

The connecting bar VS is shown in FIG. 2 and is preferably formed of plastic. In this case it is attached at the nose of the seal member with the aid of a locking mechanism ERM. Fixations for built-in sleeve components, such as noses or latchings for splice holding devices or the like, are also provided on these connecting bars.

As illustrated in FIG. 3, the socket pipe MR is pulled onto the seal members and closed to complete the cable sleeve. For this purpose, the closure beads VW are arranged along the longitudinal slot and pressed tightly together with the aid of closure elements in the form of individual clasps. A longitudinal seal LD is applied between the two beads VW and clamped therebetween by the closure elements. Formations AF are arranged on the ends to prevent wandering of the seal members. The closure beads are provided with reinforcements and protective ribs SR in order to guarantee the required rigidity of the closure beads VW.

Figure 4:
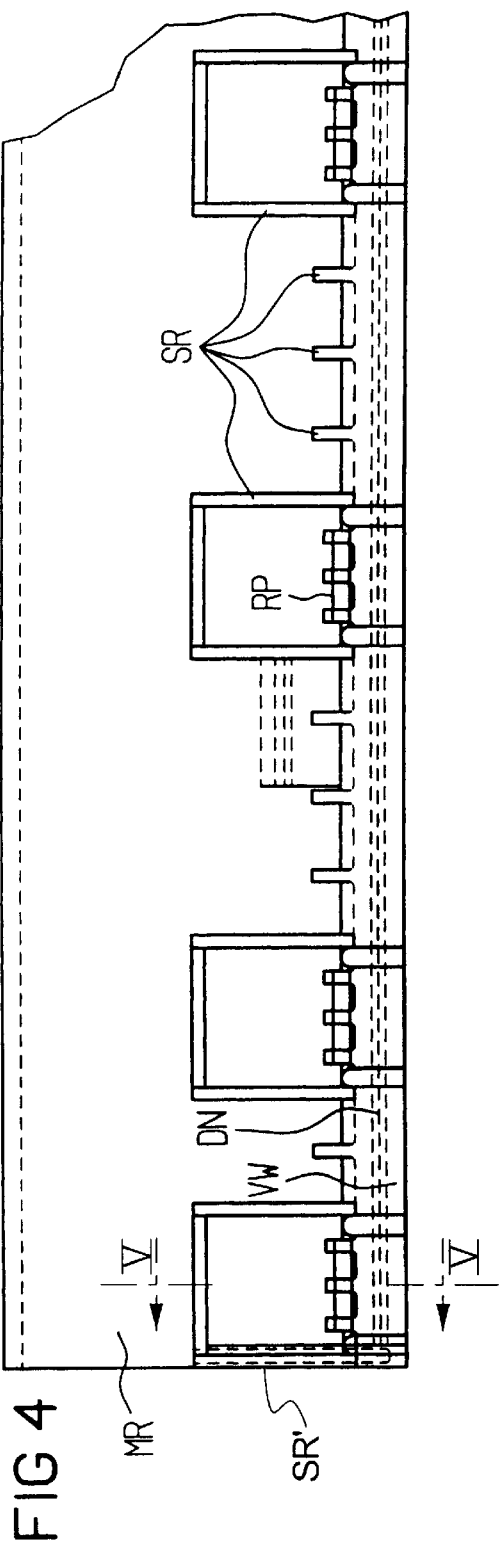
FIG. 4 is an enlarged side view of a margin of the socket pipe of FIG. 3.
Figure 5:
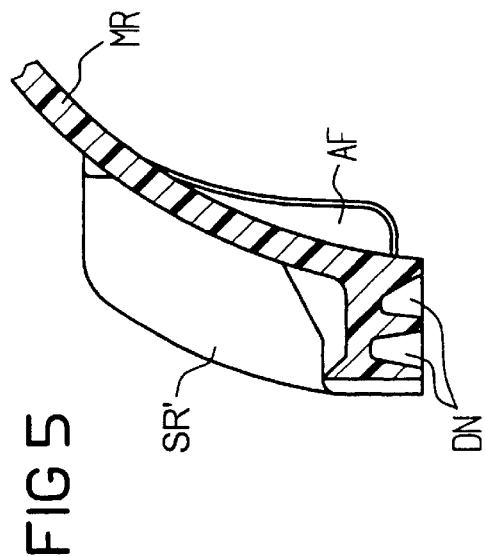
FIG. 5 is a partial cross-sectional view taken along the lines V—V of FIG. 4.

As illustrated in FIG. 4, the longitudinal closure region of the socket pipe MR has protective ribs SR along a closure bead VW. In addition, locking profiles in which the closure elements, for example snap clamps, are captively locked are formed in the regions of the closure elements, but are not shown in this drawing. The sealing slot DN, which is best illustrated in FIG. 5 and which runs longitudinally, is provided with an elastic seal which is inserted therein. As better illustrated in FIG. 5, the socket pipe MR has a single protective rib SR' and a formation AF at the end of the socket pipe. In the longitudinal closure region itself, there are two parallel sealing slots DN for accepting the seal elements.

An embodiment of a circular seal member is illustrated in FIG. 6 and is composed of a seal member segment DS02 for a bipartite oval seal member for an oval socket pipe. The structural relationships in circular and oval sleeve types are identical, so that this design does not require further discussion. From the face view of the depicted oval seal member segment DS02, the individual connected adjusting rings AR of the outer sealing wall WARA can be clearly seen, wherein the adjusting rings AR are connected only via thin ridges formed by profile slots PN, and these coact to form the enclosed cable entry opening. The diameter of the cable entry opening can be respectively adjusted to the diameter of the inserted cable by removal of the individual adjusting rings AR. The individual seal member segments DS02 are reciprocally justified in assembly by guide spikes FD. Securing noses BA, on which sleeve fixation parts can be attached, are also provided on an outer seal member wall WARA. A prestamped, but initially closed opening VE is provided for the insertion of a valve or a ground bushing. A surrounding sealing lip UDL along the outer perimeter of the seal member guarantees dust and splash protection for the surrounding seal between the seal member and the socket pipe.

FIG. 7 shows the design of the parting plane of the seal member segment DS02. As can be seen, the outer wall WARA and the inner wall WARI are successively arranged in the direction of the axis of the cable sleeve and have a hollow HKA for a cable clamping apparatus intermediately fashioned in each cable insertion region. Projections or, respectively, ribs of a cable clamping apparatus formed from a band are arranged in this annular hollow space HKA, so that the required locking results in the direction of the axis, as will be explained hereinafter. Sealing slots DN are introduced in the surfaces of the outer and inner walls WARA and WARI formed from the adjusting rings AR, the sealing compound of the sealing wrapper spreading into these slots giving the compression of the sealing member segments, thereby improving the sealing effect. The securing noses BA and the surrounding sealing lips UDL can be seen on the outer wall WARA. A projecting nose AVS, on which the connecting bar VS is attached, is fashioned on the inner side of the seal member segment DS02. Corresponding to the design of the connecting bar, the corresponding securing means, such as locking elements, are also provided. In addition, guide spikes FD can be seen, and these extend into bore holes of a counterpart when the seal member segments are assembled together.

A cable clamping apparatus KAB in the form of a band B has lateral incisions E for an optimally flexible design and is illustrated in FIG. 8. Tears or projections DR are introduced in the middle of the band, and these form claws for gripping the cable cladding with a good grip as the band is wrapped therearound. The laterally angled ribs R project outward so that during insertion into a cable entry opening of the seal member, they drop into the hollow spaces HKA provided between the outer and inner walls of the seal member segments for this purpose. The band B is secured on the cable with a tightening strap SB (FIG. 9) or a hose band clip. The actual shape of the tears DR and of the angled ribs R with the tightening strap SB for fixation on the cable are illustrated in FIG. 9.

FIG. 10 illustrates a formed gasket PD for the seal between the seal member and the socket pipe. It consists of an elastic material, such as silicon, and comprises a hollow space H running longitudinally therein. This formed gasket PD can be fashioned as an enclosed ring or as an elongated sealing piece, wherein, when formed as a ring, a transition element UG (FIG. 11) is inserted in each end to join the two ends together. The supporting surfaces or contact areas of the seal surface of the gasket PD are designed as hollow sections WHP, whereby practically a double seal is formed and guarantees a particularly good sealing relation.

The bridging element UG, which is shown in FIG. 1, is inserted in the hollow space H of the gasket PD. Barbs WH are respectively arranged at the ends of the bridging element in order to prevent a sliding out and, thus, a point of leakage. A nose or stop A is attached in the middle of the bridging element UG to guarantee that the bridging element UG is inserted equally in both ends.

Figure 12:
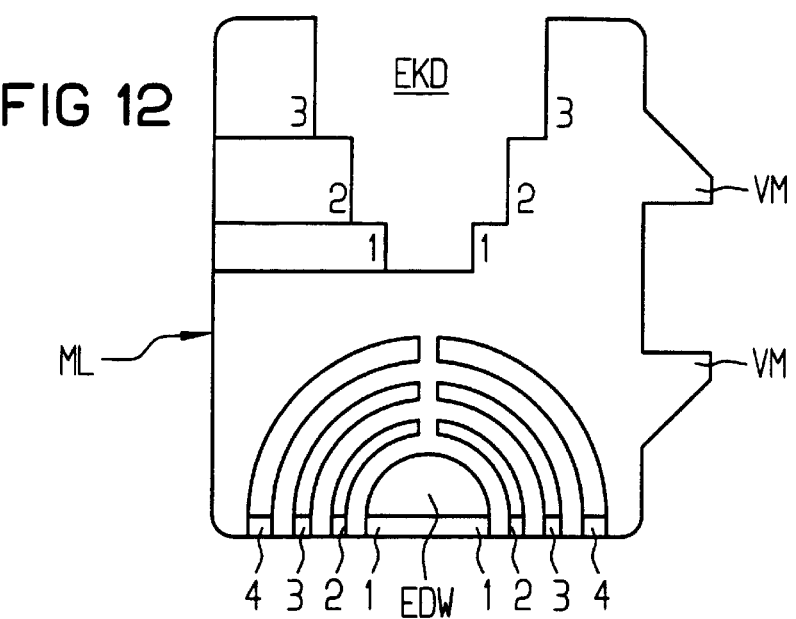
FIG. 12 is a plan view of a template or guide for determining the dimension of a cable entry opening.

A tolerance gauge, guide or template ML is shown in FIG. 12 and is used to determine the diameter of the inserted cable and the number of adjusting rings to be removed. In addition, it can determine the strength of the sealing wrapper to be applied on the cable entry openings. The embossed numbers in the template EKD enable determination of the diameter of the cable given the indication of the template EDW for the determination of the removal of the adjusting rings and the strength of the sealing wrapper. Noses VM, with the aid of which the distance between opposing seal member segments is measured, are arranged laterally on thus gauge. The noses VM engage in recesses in the seal member segments. These noses VM are allowed to insert there and the required distance and, thus, the required sealing compression can be determined.

Figure 13:
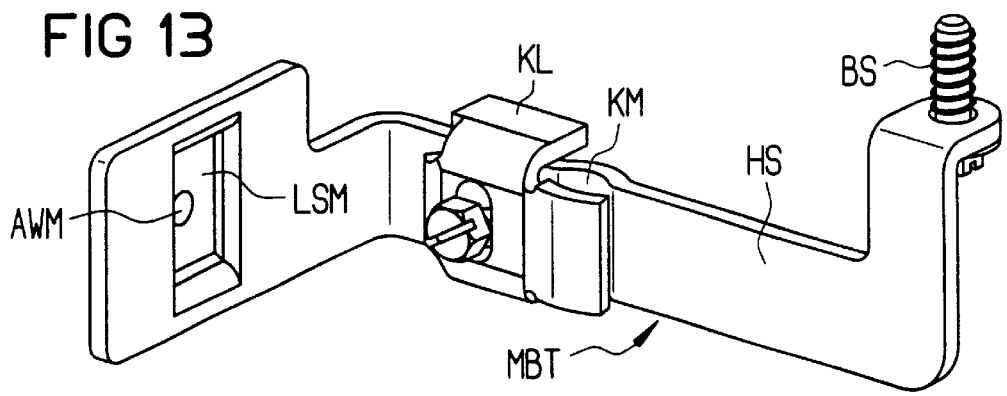
FIG. 13 is a perspective view of a cable fixation or mounting part.
Figure 14:
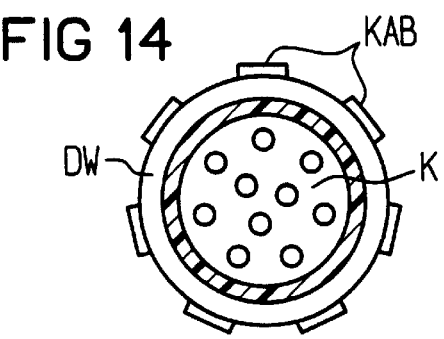
FIG. 14 is a transverse cross-sectional view of a cable having a sealing wrapper and cable clamping apparatus.
Figure 15:
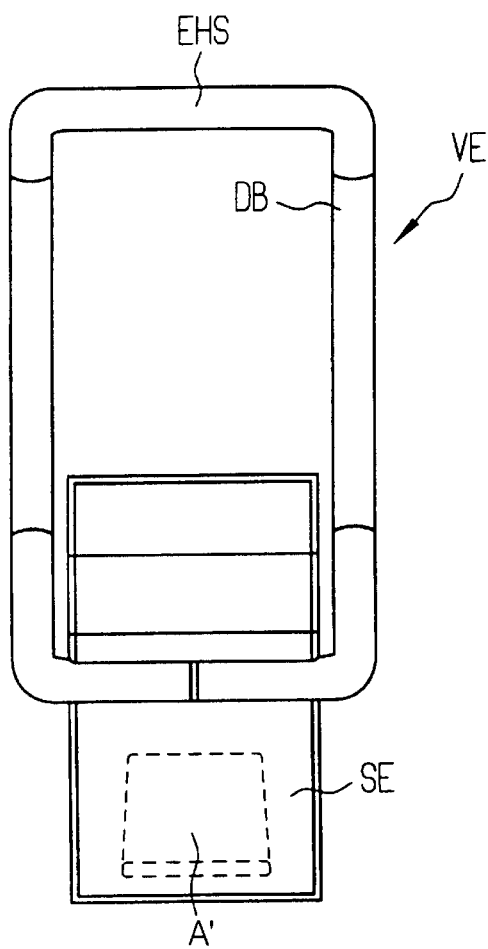
FIG. 15 is a plan view of a closure element.

A fixation sleeve part MBT is shown in FIG. 13 and consists of an angled holding bar HS. The sleeve fixation parts MBT are secured in the described noses BA on the outer sides of the seal members with the aid of fixation screws BS. The angling of the retaining bar HS is selected so that a securing can occur on a mast with a bracket LSM, at a wall with screws through a corresponding bore hole AWM or on a bearing rope with the clamp KL that comprises a corresponding clamping mouth KM.

To prepare a cable K for being received in the sealing member, it is wrapped with a sealing wrapper DW, which is held thereon by a cable clamping apparatus KAB. The sealing wrapper DW is arranged in the parting plane and the cable clamping apparatus KAB is arranged in the provided hollow spaces of the sealing member.

Figure 16:
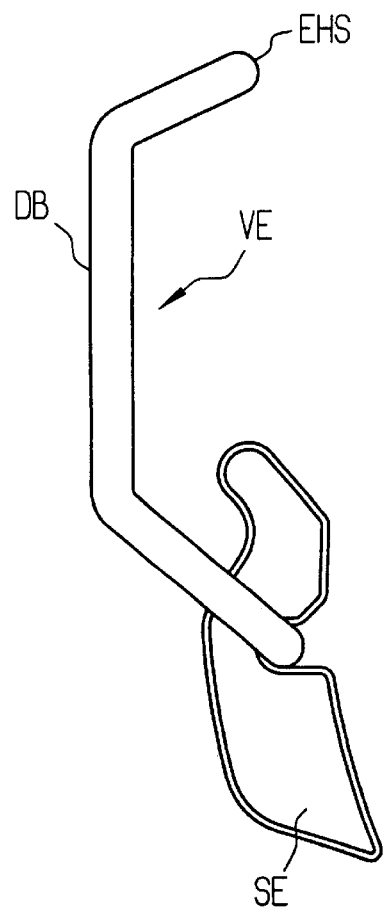
FIG. 16 is a side view of the closure element of FIG. 15.

To hold the longitudinally-extending slot of the socket pipe in a sealing relation, closure elements VE are provided and have the form of a snapping clamp or toggle clamp. Each element consists of a formed wire bow DB, which is hooked into the holding device of the closure bead at a socket pipe with its engaging side EHS. A tension element SE is arranged on the opposite side of the wire bow DB, and this element is attached at the abutment of the second closure bead of the socket pipe. By tilting the tension element, the wire bow is stressed and the closure beads are pressed against one another. A recess A' serves for the attachment of a lever tool, for example a screwdriver. The closure element VE has the wire bow DB shaped so that it spans the two closure beads of the socket pipe. This is best shown in FIG. 16. The closure pressure is generated by the tension element SE acting as a lever or toggle.

Although various minor modifications may be suggested by those versed in the art, it should be understood that we wish to embody within the scope of the patent granted hereon all such modifications as reasonably and properly come within the scope of our contribution to the art.

We claim:

1. A cable sleeve comprising a socket pipe and at least one seal member transversely divided along a parting plane, the seal member having two walls residing in succession in the direction of the cable axis, said walls having adjustable cable entry openings, the cable entry openings being formed by removable, concentrically arranged rings, a hollow space in the cable entry openings between the two walls, a sealing wrapper consisting of a plastic sealing material being arranged in the regions of the walls of the cable entry openings on the cable inserted therein and the walls of the seal member comprising sealing slots in the parting plane therebetween.

2. A cable sleeve according to claim 1, wherein the seal member consists of two seal member segments.

3. A cable sleeve according to claim 1, wherein the seal member comprises three seal member segments and is transversely divided by two parting planes.

4. A cable sleeve according to claim 1, further comprising a cable clamping apparatus that consists of a band bent in a U shape with slits along the edges, said band adapted to be received in the hollow space between the two walls of the seal member, the band having tears on a side facing the inserted cable and the band being secured on the cable with a tension band.

5. A cable sleeve according to claim 1, further comprising a template to determine the number of adjustment rings to be removed, the strength of the seal wrapper of the cable entry opening and a required degree of closure between the seal member segments in compression.

6. A cable sleeve according to claim 5, wherein the template comprises stepped slits to form a gauge for determining the cable diameter and to determine the adjusting rings to be removed, the template having slits for determining the size of the sealing wrapper and having noses for determining the distance between the seal member segments in assembly.

7. A cable sleeve according to claim 1, which includes a springing sealing lip arranged on the outer periphery of the seal member in a surrounding fashion.

8. A cable sleeve according to claim 1, which includes securing noses arranged on an outer surface of the seal member.

9. A cable sleeve according to claim 8, further comprising a sleeve fixation part configured to be attached to the securing noses of the seal member.

10. A cable sleeve according to claim 9, wherein the sleeve fixation part consists of an angled holding bar on which clamps, brackets and bore holes are arranged for attachment elements of ropes, masts and wall assemblies.

11. A cable sleeve according to claim 1, wherein the cable sleeve has two seal members which are connected to each other via at least one connecting bar made of plastic.

12. A cable sleeve according to claim 11, wherein the connecting bar comprises a receptacle for receiving splice elements and light waveguide splice cassettes.

13. A cable sleeve according to claim 1, wherein the cable sleeve can be closed with individual closure elements in the form of snapping clamps, said closure elements engaging closure beads, and the closure elements being protected by lateral protective ribs.

14. A cable sleeve according to claim 13, wherein the closure element consists of a rectangularly bent wire bow that is configured to engage the closure bead of the socket pipe with an engaging end, a tension element being arranged in a tiltable fashion at the opposite end of the bow.

15. A cable sleeve according to claim 1, wherein the seal members have an outer perimeter surrounding slot for receiving a sealing gasket.

* * * * *